United States Patent
Thomas (10) Patent No.: US 6,312,021 B1
(45) Date of Patent: Nov. 6, 2001

(54) END-SLOTTED FLEXIBLE METAL HOSE (75) Inventor: R. Winfield Thomas, West Lebanon, IN (US)

(73) Assignee: Tru-Flex Metal Hose Corp., West Labanon, IN (US)

( * ) Notice: Subject to any disclaimer, the term of this patent is extended or adjusted under 35 U.S.C. 154(b) by 0 days.

(21) Appl. No.: 09/009,552

(22) Filed: Jan. 20, 1998

Related U.S. Application Data (63) Continuation-in-part of application No. 08/592,583, filed on Jan. 26, 1996, now abandoned.

(51) Int. Cl.⁷ ............................................. F16L 21/06
(52) U.S. Cl. ......................... 285/253; 285/322; 285/252; 285/903; 285/226
(58) Field of Search .................................. 285/252, 253, 285/235, 236, 226, 903, 322, 382

(56) References Cited

U.S. PATENT DOCUMENTS

| | | |
|---|---|---|
| 1,797,151 | 3/1931 | Lord . |
| 2,257,895 | 10/1941 | Woodford et al. . |
| 2,395,745 * | 2/1946 | King ....................... 285/233 |
| 2,420,153 | 5/1947 | Sprenger et al. . |
| 2,460,984 * | 2/1949 | Hill et al. ................ 285/233 |
| 2,516,631 | 7/1950 | Jacobson . |
| 2,666,657 | 1/1954 | Howard et al. . |
| 2,987,329 | 6/1961 | Barton . |
| 3,627,354 | 12/1971 | Toepper . |
| 4,113,289 * | 9/1978 | Wagner et al. ....................... 285/322 |
| 4,312,526 | 1/1982 | Cassel . |
| 4,578,855 * | 4/1986 | Van Der Hagen .................. 285/236 |
| 4,660,862 * | 4/1987 | Cassel et al. ....................... 285/253 |
| 4,763,932 * | 8/1988 | Matz et al. ........................ 285/253 |
| 4,846,147 | 7/1989 | Townsend et al. . |
| 5,072,972 * | 12/1991 | Justice ................................. 285/903 |
| 5,133,579 | 7/1992 | Anderson et al. . |
| 5,158,328 * | 10/1992 | Anderson et al. .................. 285/168 |
| 5,163,717 * | 11/1992 | Wise ................................... 285/903 |
| 5,180,196 * | 1/1993 | Skinner ............................... 285/903 |
| 5,362,113 | 11/1994 | Thomas . |
| 5,417,460 * | 5/1995 | Lunder ................................ 285/903 |
| 5,632,513 * | 5/1997 | Cassel ................................. 285/232 |
| 5,794,986 * | 8/1998 | Gansel et al. ..................... 285/903 |
| 5,882,046 * | 3/1999 | Thomas .............................. 285/236 |

FOREIGN PATENT DOCUMENTS

| | | |
|---|---|---|
| 0 565 466 A1 | 10/1993 | (EP) . |
| 785210 | 4/1935 | (FR) . |
| 2324866 | 5/1977 | (FR) . |
| 2 278 901 | 12/1994 | (GB) . |

* cited by examiner

Primary Examiner—Eric K. Nicholson (57) ABSTRACT

An end-slotted flexible metal hose includes a hose section with body and end sections and a hose clamp. The hose section forms a bore therethrough having a relatively constant diameter. The end section includes a plurality of slots which extend through a sidewall of the hose section to the bore and permit the end section to be constricted by the hose clamp to reduce the bore diameter to provide a relatively tight engagement with a tube on which the hose assembly is mounted.

8 Claims, 10 Drawing Sheets

END-SLOTTED FLEXIBLE METAL HOSE

CROSS-REFERENCE TO RELATED APPLICATION

The present application is a continuation-in-part of U.S. patent application Ser. No. 08/592,583, Filed Jan. 26, 1996, now abandoned.

BACKGROUND OF THE INVENTION

1. Field of the Invention

The present invention relates generally to flexible metal hose and in particular to flexible metal hose end connections.

2. Description of the Related Art

Flexible metal hoses are utilized in a wide variety of applications for conveying various liquids, gases and bulk materials. Flexibility is an important characteristic in many such applications in order to permit interconnecting portions of a transfer system through curved sections of a hose run. The flexible, curved hose sections are often used to interconnect straight pipe sections. Flexible metal piping is also well adapted for connecting piping sections which are misaligned, or which are subject to misalignment and repositioning in use. Still further, flexible metal piping is frequently utilized for applications which are subject to vibration and heat.

For example, flexible metal hoses are often used in exhaust systems for conveying hot exhaust gases. In such applications vibration can be a problem since internal combustion engines produce significant amounts of vibration in operation. Moreover, the exhaust gases are typically at a relatively high temperature within the exhaust system. Flexible metal hoses are thus normally well-suited for exhaust system applications since they tend to be relatively effective for absorbing vibration and since they can be configured with corrugations and the like for increased heat-dissipating surface areas. Moreover, flexible metal hoses can be provided in various lengths and can be bent into desired configurations for joining misaligned exhaust system components. Flexible metal piping is commonly used in certain types of vehicles, such as over-the-road trucks, for connecting their engines and exhaust stacks, particularly where the exhaust system hoses must accommodate curves, misalignment, heat and vibration.

Flexible metal hose can be formed in several ways. A common manufacturing process involves spiral-winding a flat metal strip and interlocking its leading and trailing edges to form a spiral-wound flexible hose section wherein the interlocked band edges permit a certain amount flexure. An alternative is to corrugate piping which has been roll formed from sheet stock to provide corrugated flexible metal hoses with single-thickness walls.

Flexible metal hosing can be connected to inlet and outlet devices with several different techniques, such as welding, clamping, etc. Clamps are often used for connecting flexible metal hose sections to other exhaust system components. Clamps can often be installed with minimal equipment. However, clamps can present difficulties in obtaining fluid-tight seals. For example, annular hose sections may be difficult to compress with normal band and ribbon-type clamps.

The present invention addresses some of the problems associated with securely fastening flexible metal hose to other exhaust system components. Heretofore there has not been available an end-slotted flexible metal hose with the advantages and features of the present invention.

SUMMARY OF THE INVENTION

In the practice of the present invention, a flexible metal hose assembly is provided which includes a hose section and a hose clamp. The hose section includes body and end sections. A bore extends coaxially through the hose section and is open at a hose section end. A plurality of slots are formed in the end section and extend through a sidewall of the hose section. The bore defines a normal diameter D.0. The hose clamp fits over the slots at the end section and has an expanded configuration whereby the hose end section has a diameter substantially constant with the hose section diameter. The hose clamp can be tightened to a constricted configuration for providing a reduced diameter at the end section. Slots with closed and open ends are provided in both interlocking band and corrugated types of flexible metal hose.

OBJECTS AND ADVANTAGES OF THE INVENTION

The principle objects and advantages of the present invention include: providing a flexible metal hose assembly; providing such a hose assembly which includes body and end sections; providing such a hose assembly which includes a spiral-wound, interlocking construction; providing such a hose assembly which includes a corrugated construction; providing such a hose assembly which includes body and end sections; providing such a hose section which includes a plurality of slots in the end section thereof; providing such a hose assembly wherein the slots can have closed-end configurations; providing such a hose assembly wherein the slots can be open at an end of the hose assembly; providing such a hose assembly wherein the slotted, end section has an expanded diameter generally equal to a diameter of the hose section body section; providing such a hose assembly wherein the end section has a constricted diameter less than the diameter of the body section; providing such a hose assembly with a clamp for constricting the hose end section to its constricted configuration; and providing such a hose assembly which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates a flexible metal hose assembly embodying the present invention. The hose assembly 2 generally comprises a flexible hose section 4 and a hose clamp 6.

II. Flexible hose section 4

Figure 1:
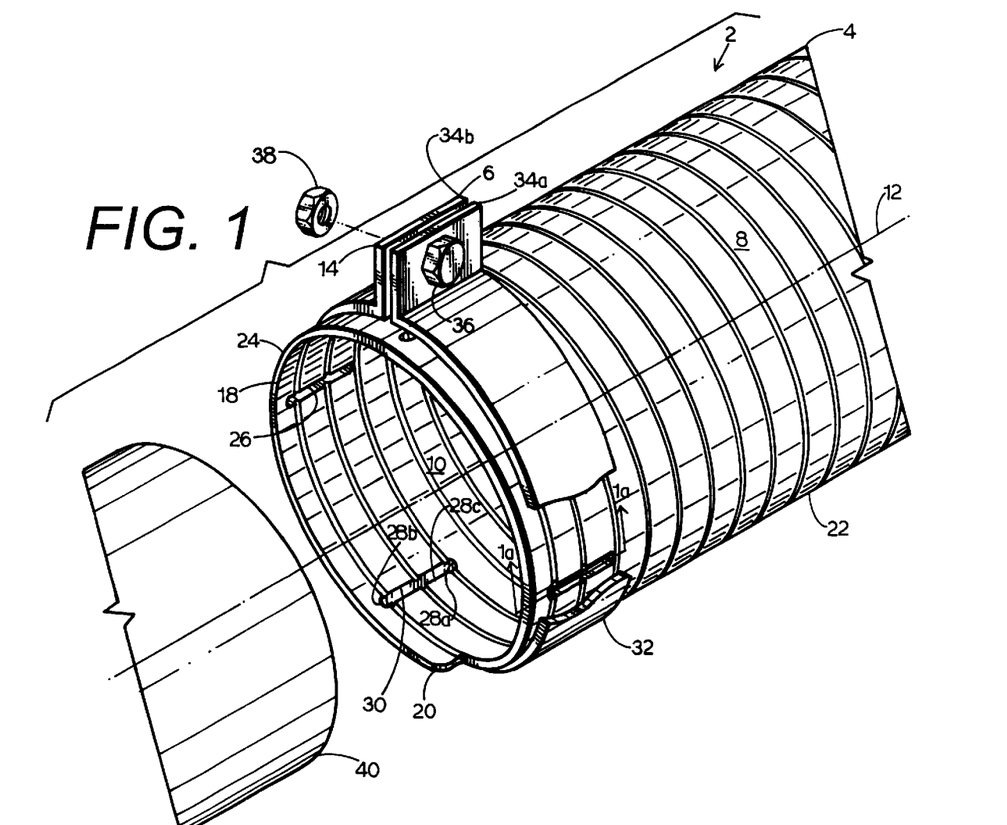
FIG. 1 is a perspective view of an end-slotted flexible metal hose assembly embodying the present invention.
Figure 1A:
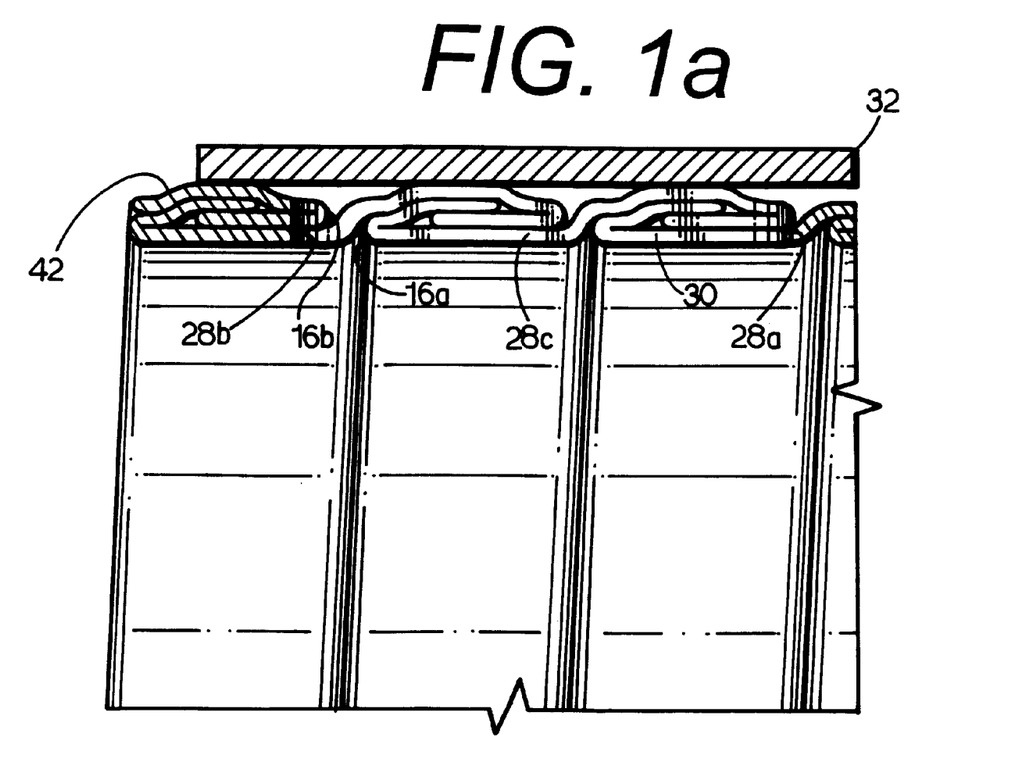
FIG. 1a is an enlarged, fragmentary, cross-sectional view thereof taken generally along line 1a—1a in FIG. 1.

The flexible hose section 4 includes a sidewall 8 with a generally cylindrical configuration forming a bore 10 extending generally coaxially with a longitudinally-extending axis 12 of the hose section 4. The hose section sidewall 8 can comprise, for example, a spiral-wound metal band 14 with interlocking leading and trailing edges 16a, 16b. The bore 10 is open at an end 18 of the hose section 4 and forms a generally circular rim 20 thereat.

The hose section 4 forms a body section 22 and a slotted end section 24 including a plurality of slots 26 positioned in generally radially-spaced relation with respect to the axis 12. For example, in the hose section 4 of the disclosed embodiment, four slots 26 are provided at radial intervals of approximately 90°. Each slot 26 includes inner and outer ends 28a, 28b with rounded configurations and a pair of parallel slot sides 28c extending therebetween. The slots 26 penetrate the sidewall 8 and are open to the bore 10. The slot outer ends 28b are positioned in spaced relation inwardly from the hose section end 18. The slots 26 have slot perimeters 30 which are cut or punched through the sidewall 8 whereat multiple thicknesses of the folded, interlocked band 14 are present.

III. Hose Clamp 6

The hose clamp 6 includes a generally annular band with first and second ends 34a,b which are interconnected by a bolt 36 and nut 38 for adjustably drawing the clamp ends 34a,b together whereby the diameter of the circle enclosed by the band 32 can be varied in size as required for particular applications. The hose clamp band 32 is located substantially over the slots 26 and functions to reduce the diameter of the bore 10 from a relatively constant diameter D to a lesser diameter D.1 upon tightening of the bolt 36. The hose clamp 6 is thus adjustable between an expanded position providing a continuous bore diameter D.0 and a constricted position with a reduced bore diameter D.1 in the general area of the hose end section 18. The hose clamp 6 cooperates with the slots 26 to permit a slight constricting of the hose section bore 10 from diameter D.0 to diameter D.1. More specifically, the slot longitudinal edges are slightly converged by the constricting action of the clamp 6. As shown in FIG. 1, the slots can be substantially covered by the hose clamp band 32 for improving the effectiveness of a fluid seal at a connection of a straight tube 40 to the hose section end 18. A relatively fluid-tight seal can thus be formed between a straight tube 40 with an outside diameter D.2 which is slightly less than the normal bore diameter D.0 by constricting the end section 24 to a substantially equal diameter D.1 to straight tube diameter D.2.

Moreover, the slots 26 cooperate with the multi-layered construction of the end section 24 thereat to facilitate contraction of the end section 24 since the slots permit slight, differential slippage among the multiple, overlapping layers 42 of the metal band 14.

The size, number, spacing and configuration of the slots 26 can vary to meeting the requirements of particular applications. For example, a greater number of slots 26 could be provided at lesser radial intervals. The slots could also be longer or shorter and variations therein could be employed to achieve different constricted diameters D.1. Thus, the slot-related variables could conform to the tolerances of the hose end section 24 with respect to the straight tube 40.

IV. First Modified Embodiment Hose Assembly 102

Figure 2:
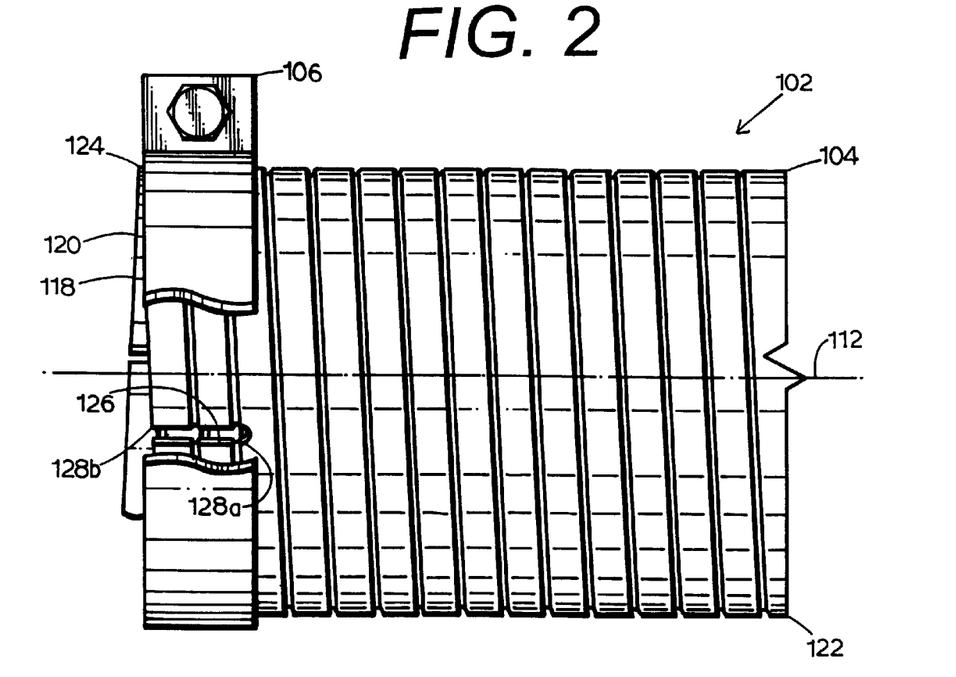
FIG. 2 is an elevational view of a flexible metal hose assembly embodying the present invention with open-end slots.

A flexible metal hose assembly 102 comprising a first modified or alternative embodiment of the present invention is shown in FIG. 2 and generally includes a hose section 104 and a clamp 106 similar to the construction of the hose section 4. The hose section 104 includes body and end sections 122, 124, the latter including a plurality of slots 126 extending longitudinally in regularly-spaced relation with respect to an axis 112. Each slot 126 includes an inner, rounded end 128a and an outer end 128b open at an end 118 of the hose section 104. The hose section end 118 forms a generally circular rim 120 at which the slot outer ends 128b are open. The open-ended configuration of the slots 126 facilitates constricting the end section 124 to a reduced diameter.

V. Second Modified Embodiment Hose Assembly 202

Figure 3:
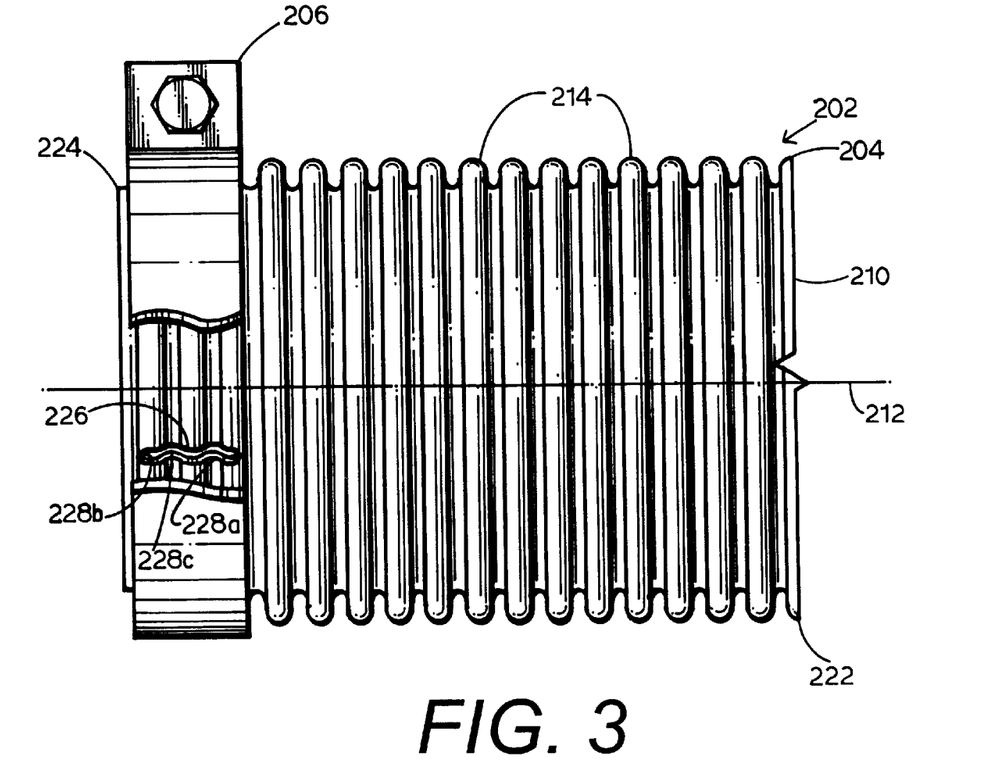
FIG. 3 is an elevational view of a flexible metal hose assembly comprising a second modified embodiment of the present invention with a corrugated hose section and closed-end lots.

FIG. 3 shows a flexible hose assembly 202 comprising a second modified embodiment of the present invention. The hose assembly 202 includes a hose section 204 with a bore 210 generally coaxial with an axis 212. The flexible hose 202 has body and end sections 222, 224. The body section 222 has a single-thickness wall construction with multiple annular corrugations 214. The end section 224 includes a plurality of slots 226 each having inner and outer closed, rounded ends 228a, 228b and generally parallel, longitudinally-extending slot sides 228c. The second modified embodiment flexible hose assembly 202 includes a hose clamp 206 for constricting the end section 224 in a manner similar to the previously described embodiments.

The corrugations 214 can be either annular or spiral, and can have varying diameters.

VI. Third Modified Embodiment Hose Assembly 302

Figure 4:
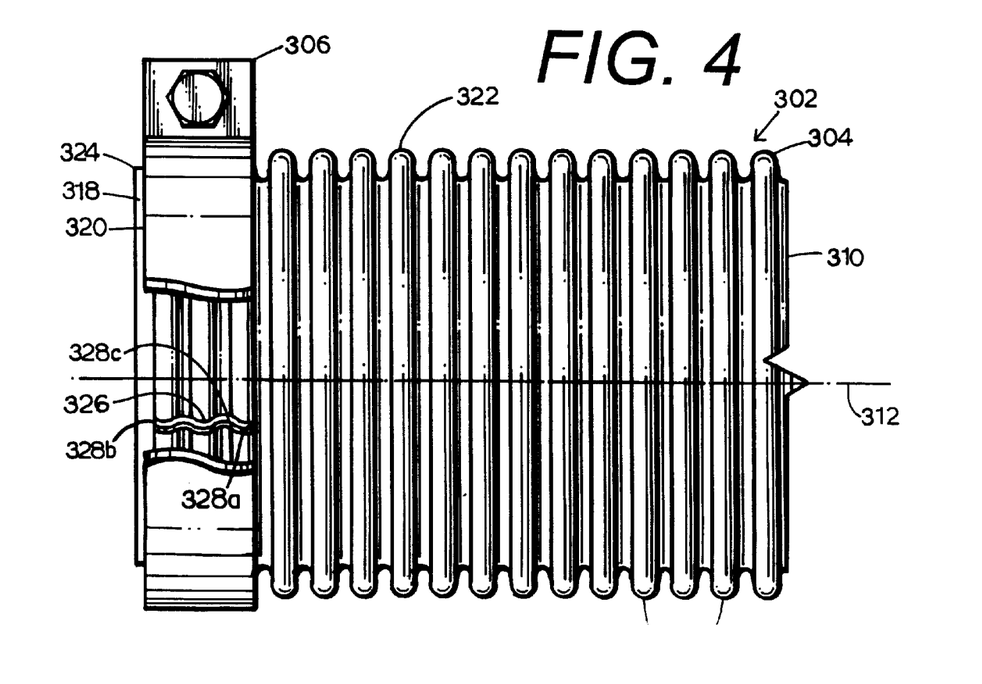
FIG. 4 is an elevational view of a flexible metal hose assembly comprising a third modified embodiment of the present invention with a corrugated hose section and open-end slots.

A flexible hose assembly 302 comprising a third modified or alternative embodiment of the present invention is shown in FIG. 4 and is generally designated by the reference numeral 302. The flexible hose assembly 302 includes a corrugated hose section 304 which forms a bore 310 which is generally coaxially with an axis 312. The hose section 304 includes corrugations 314, a body section 322 and an end section 324.

The end section 324 includes a plurality of slots 326 positioned in regularly-spaced relation around the axis 312 and extending longitudinally in generally parallel relation therewith. Each slot includes a closed, rounded inner end 328a, an open, outer end 328b open at a generally circular rim 320 formed at an end 318 of the hose section 304 and a pair of longitudinally-extending, generally parallel sides 328c. The hose assembly 302 functions in a manner substantially similar to the previously described embodiments whereby the slots 326 facilitate constricting the bore 310 at the end section 324 with a hose clamp 306 for facilitating a fluid seal thereat. Various configurations, numbers and spacings of the slots 326 can be provided for meeting the requirements of particular applications.

VII. Fourth Modified Embodiment Hose Assembly 402

Figure 5:
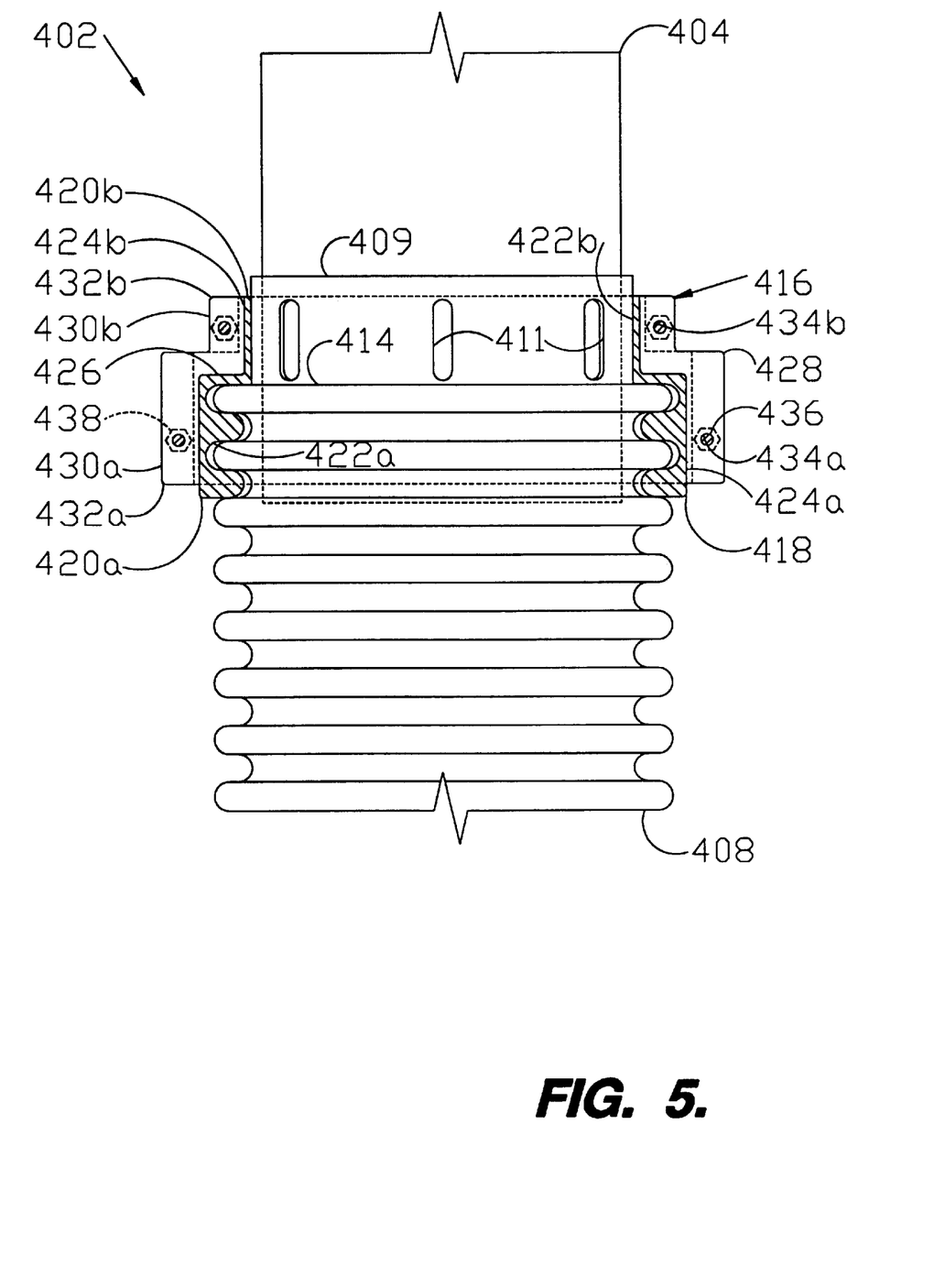
FIG. 5 is an elevational view of a flexible metal hose assembly comprising a fourth modified embodiment of the present invention.

A fourth modified embodiment hose assembly 402 is shown in FIG. 5 and includes a flexible hose 408 with a generally cylindrical end extension 409 having a plurality of regularly-spaced, longitudinally-extending slots 411. The extension 409 extends in an upstream direction from a last land 414 of a corrugated portion of the flexible hose 408. A clamp assembly 416 includes a gasket 418 with downstream and upstream sections 420a,b and a bore 422 with downstream and upstream bore sections 422a,b. The bore downstream section 422a is corrugated like the corrugated portion of the flexible hose 408. The gasket bore upstream section 422b is generally smooth-walled to correspond to the configuration of the extension 409. The gasket 418 has an outer surface 424 with downstream and upstream sections 424a,b respectively. A shoulder 426 is formed between the gasket downstream and upstream sections 420a,b. A band subassembly 428 includes a pair of band halves 430 each having downstream and upstream sections 430a,b with respective downstream and upstream band end flanges 432a,b. The band halves 430 are compressed together over the gasket 418 by bolts 436 mounting nuts 438 and received in receivers 434a,b in the downstream and upstream flanges 432a,b respectively for clamping a rigid pipe 404.

VIII. Fifth Modified Embodiment Flexible Hose Assembly 502

Figure 6:
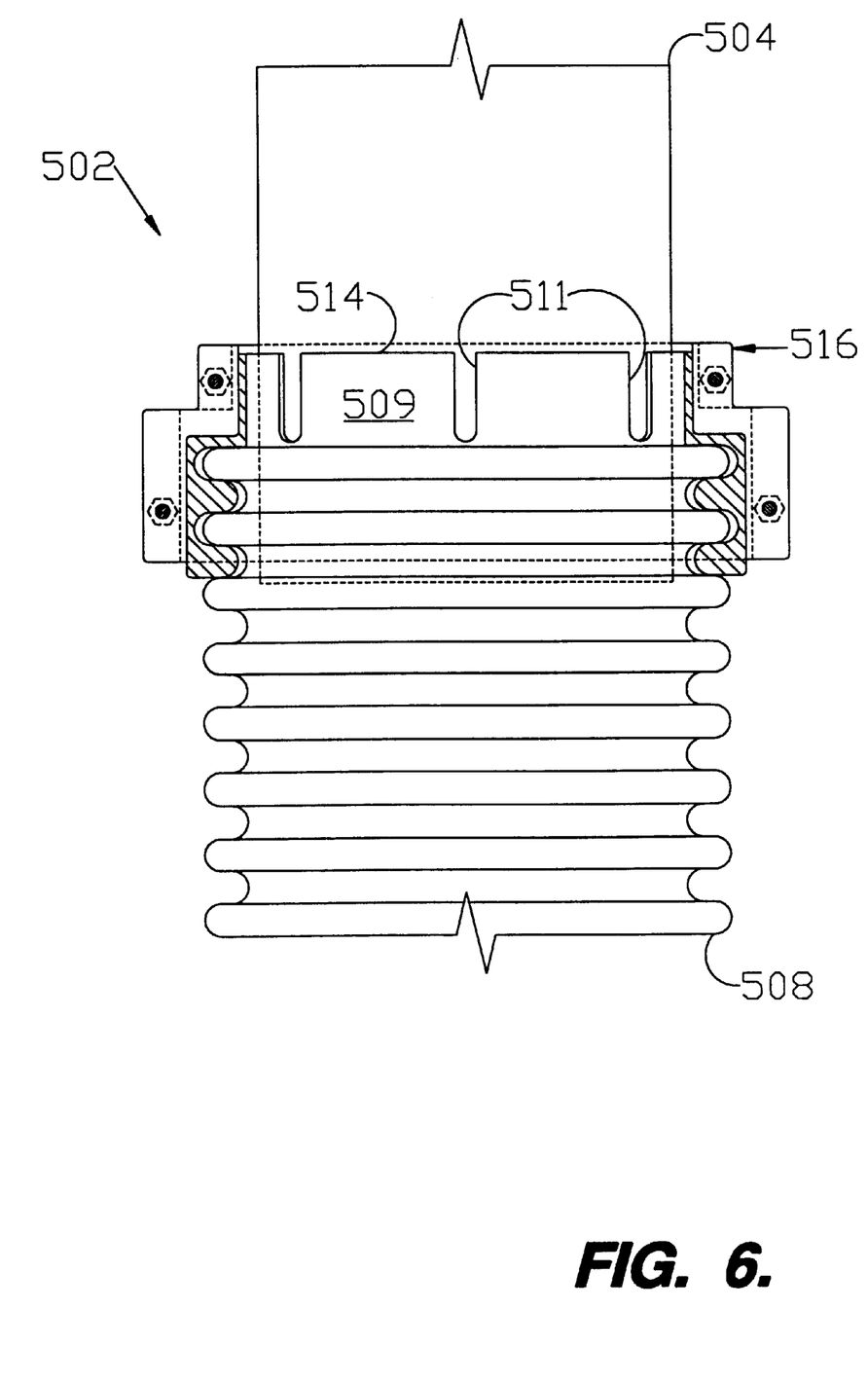
FIG. 6 is an elevational view of a flexible metal hose assembly comprising a fifth modified embodiment of the present invention.

FIG. 6 shows a flexible hose assembly 502 comprising a fifth modified embodiment of the present invention. The flexible hose assembly 502 includes a flexible hose 508 with an extension 509 having a plurality of open-ended slots 511 which extend to an end 514 of the flexible hose 508. The open-ended slots 511 function to facilitate constriction of the flexible hose extension 509 on a rigid pipe 504 by a clamp assembly 516.

IX. Sixth Modified Embodiment Flexible Hose Assembly 602

Figure 7:
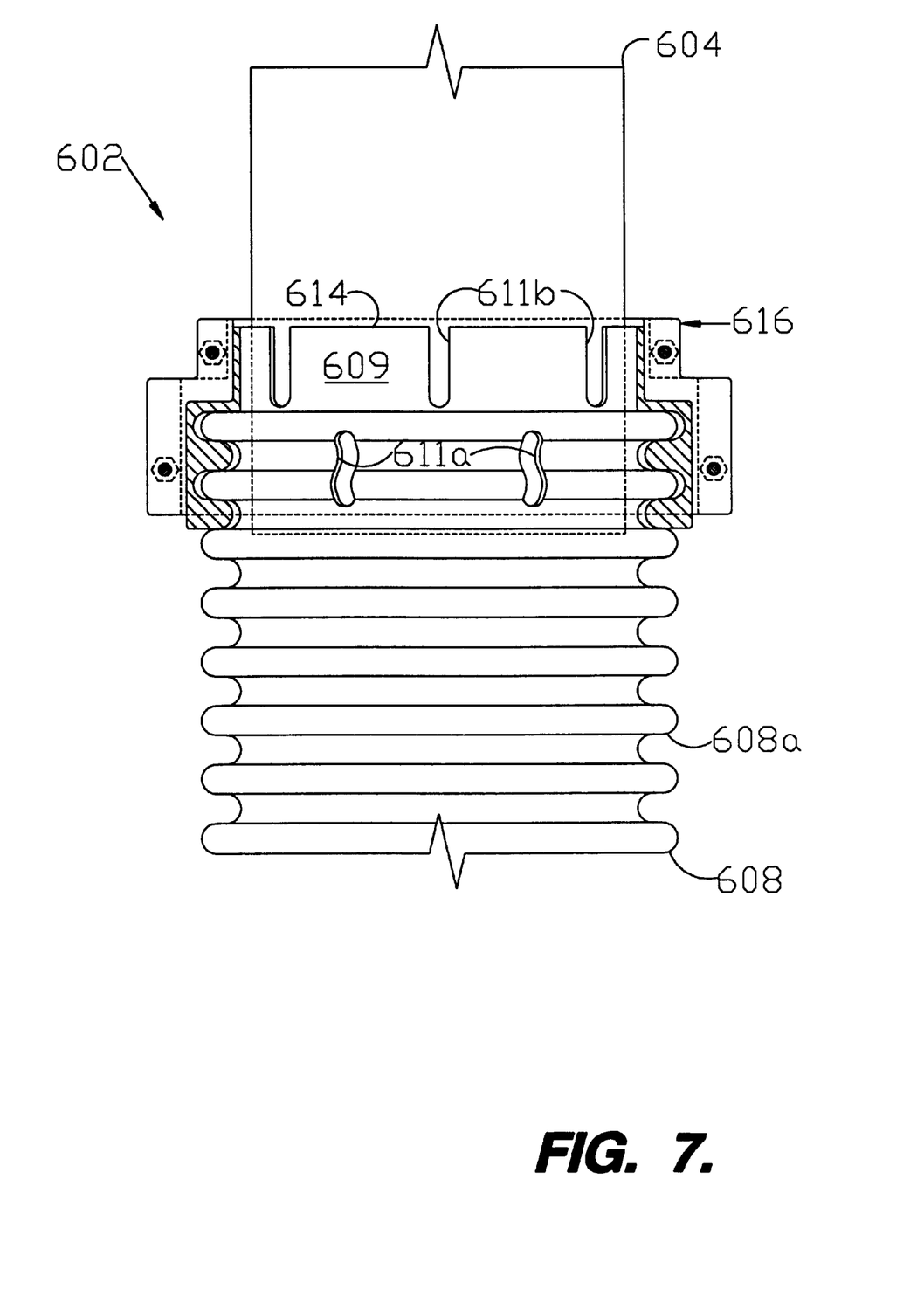
FIG. 7 is an elevational view of a flexible metal hose assembly comprising a sixth modified embodiment of the present invention.

A sixth modified embodiment flexible hose assembly 602 is shown in FIG. 7 and includes a plurality of regularly-spaced, longitudinally-extending captured slots 611a in a corrugated portion 608a of a flexible hose 608. The flexible hose 608 also includes a plurality of open-ended slots 611b in a flexible hose extension 609 which terminates at a flexible hose end 614. The open-ended slots 611b are open at the flexible hose end 614. The captured and open-ended slots 611a,b respectively function to facilitate gripping a rigid pipe 604 at both downstream and upstream locations by a clamp assembly 616.

X. Seventh Modified Embodiment Flexible Hose Assembly 702

Figure 8:
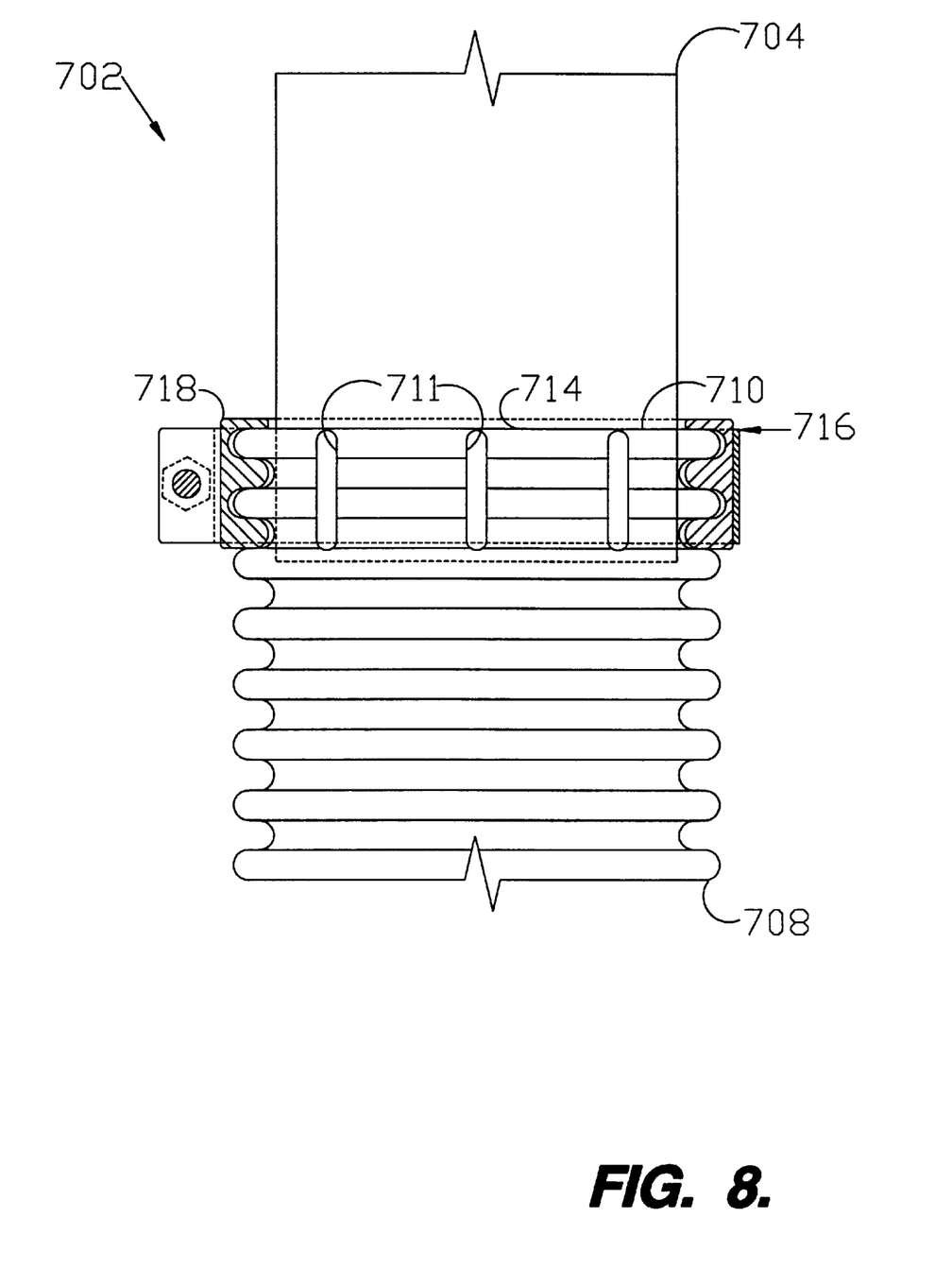
FIG. 8 is an elevational view of a flexible metal hose assembly comprising a seventh modified embodiment of the present invention.

FIG. 8 shows a flexible hose assembly 702 comprising a seventh modified embodiment of the present invention and including a flexible hose 708 with an end 714 formed by the last corrugation thereof. The corrugated flexible hose 708 is received by a gasket 718 with a corresponding corrugated configuration. A plurality of regularly-spaced, longitudinally-extending, closed-end slots 711 are formed in the corrugated hose 708 in proximity to its end 714. The slots 711 accommodate radial constriction and expansion of the flexible hose 708 to facilitate a grip thereof on a rigid pipe 704 by a clamp assembly 716.

XI. Eighth Modified Embodiment Flexible Hose Assembly 802

Figure 9:
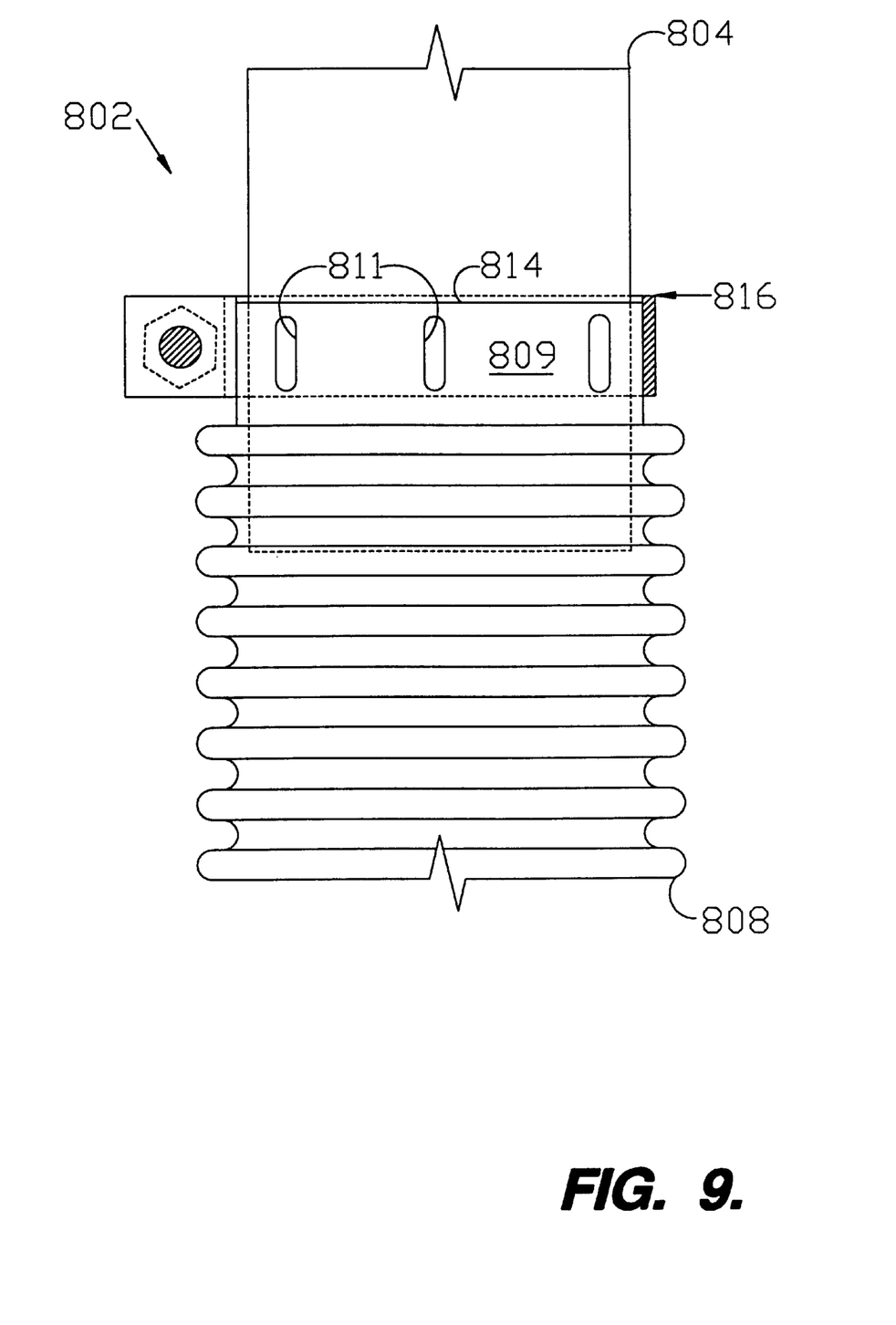
FIG. 9 is an elevational view of a flexible metal hose assembly comprising an eighth modified embodiment of the present invention.

FIG. 9 shows a flexible hose assembly 802 comprising an eighth modified embodiment of the present invention. The flexible hose assembly 802 includes a corrugated flexible hose 808 with a smooth-walled extension 809 forming an end 814 of the flexible hose 808. The extension 809 is provided with a plurality of regularly-spaced, longitudinally-extending slots 811 which are open at the extension end 814. A clamp 816 encircles the extension 809 and draws the slots 811 together as it tightens to improve a grip on the rigid pipe 804.

XII. Ninth Modified Embodiment Flexible Hose Assembly 902

Figure 10:
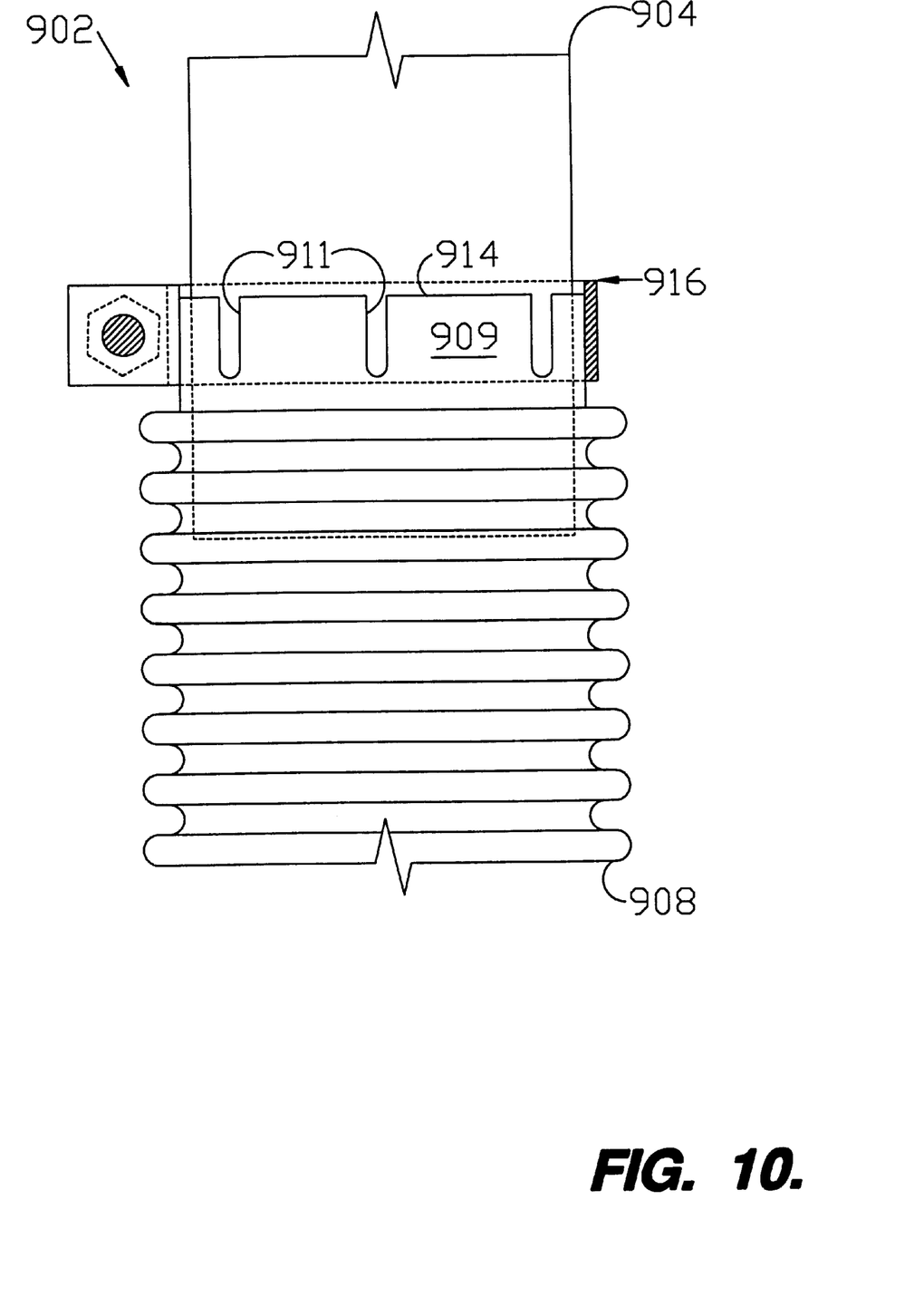
FIG. 10 is an elevational view of a flexible metal hose assembly comprising a ninth modified embodiment of the present invention.

FIG. 10 shows a flexible hose assembly 902 comprising a ninth modified embodiment of the present invention. The flexible hose assembly 902 includes a corrugated flexible hose 908 with a smooth-walled extension 909 forming an end 914 of the flexible hose 908. The extension 909 is provided with a plurality of regularly-spaced, longitudinally-extending slots 911 which are open at the extension end 914. A clamp 916 encircles the extension 909 and draws the slots 911 together as it tightens to improve a grip on a rigid pipe 904.

It is to be understood that while certain forms of the present invention have been illustrated and described herein, it is not to be limited to the specific forms or arrangement of parts described and shown.

What is claimed and desired to be secured by Letters Patent is as follows:

1. An end-slotted flexible metal hose assembly, which comprises:
    (a) a flexible hose with an end and a corrugated section including a corrugated section end;
    (b) a compressible slot formed in said flexible hose in proximity to the end thereof;
    (c) a gasket including a gasket bore receiving said flexible metal hose and a gasket outer surface;
    (d) a clamp generally encircling said gasket in contact with the outer surface thereof and including constriction means for constricting said gasket on said flexible hose;

(e) a generally cylindrical flexible hose extension extending from said corrugated section end and terminating at an extension end formed by said flexible hose end;

(f) said gasket having a first section with corrugations in the bore thereof corresponding to the corrugations of said flexible pipe corrugated section; and (g) said gasket having a second section with said gasket bore having a generally smooth-walled configuration thereat and receiving said extension.

2. The flexible hose assembly according to claim 1 wherein:

(a) said gasket first section includes a first outside diameter at the outer surface thereof;

(b) said gasket second section includes a second outside diameter at the outer surface thereof;

(c) said gasket first outside diameter is greater than said gasket second outside diameter;

(d) said gasket forms a shoulder between its first and second sections at the outer surface thereof; and (e) said clamp has a first inside diameter corresponding to the outside diameter of said gasket first section and a second, lesser inside diameter corresponding to the outside diameter of the gasket second section.

3. The flexible hose assembly according to claim 2, which includes:

(a) a plurality of said slots formed in said extension and positioned in radially-spaced relation around same.

4. The flexible hose assembly according to claim 3, which includes:

(a) said slots being positioned in spaced relation inwardly from said hose extension end.

5. The flexible hose assembly according to claim 3, which includes:

(a) each said slot being open at said extension end.

6. The flexible hose assembly according to claim 2, which includes:

(a) said flexible hose corrugated section having a plurality of longitudinally-extending slots positioned in radially-spaced relation and covered by said gasket first section.

7. An end-slotted flexible hose assembly for connection to a rigid pipe having an end, which comprises:

(a) a flexible hose with an end and a corrugated section including a corrugated section end;

(b) a compressible slot formed in said flexible hose in proximity to the end thereof;

(c) a gasket including a gasket bore receiving said flexible metal hose and a gasket outer surface, said gasket being located substantially entirely outside said flexible hose;

(d) a clamp generally encircling said gasket in contact with the outer surface thereof and including constriction means for constricting said gasket on said flexible hose;

(e) said flexible hose having a hose bore adapted to telescopically receive the rigid pipe;

(f) said clamp overlying said slot and said gasket; and (g) said clamp having an expanded position with said flexible hose bore having a relatively constant diameter and a constricted position with said flexible hose bore having a reduced diameter at said slot.

8. The flexible hose assembly according to claim 7, which includes:

(a) a plurality of said slots positioned in radially-spaced relation around said hose corrugated section and covered by said gasket; and (b) said gasket bore having a corrugated configuration corresponding to the corrugated configuration of said hose corrugated section.

* * * * *